US009684282B2

(12) United States Patent
Barbastathis et al.

(10) Patent No.: US 9,684,282 B2
(45) Date of Patent: Jun. 20, 2017

(54) SYSTEM, METHOD AND APPARATUS FOR WAVELENGTH-CODED MULTI-FOCAL MICROSCOPY

(75) Inventors: George Barbastathis, Boston, MA (US); Yuan Luo, Taipei (TW); Se Baek Oh, Millbrae, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 903 days.

(21) Appl. No.: 13/500,464

(22) PCT Filed: Oct. 8, 2010

(86) PCT No.: PCT/US2010/051981
§ 371 (c)(1),
(2), (4) Date: Aug. 31, 2012

(87) PCT Pub. No.: WO2011/044464

PCT Pub. Date: Apr. 14, 2011

(65) Prior Publication Data

US 2012/0327489 A1 Dec. 27, 2012

Related U.S. Application Data

(60) Provisional application No. 61/250,306, filed on Oct. 9, 2009, provisional application No. 61/264,432, filed (Continued)

(51) Int. Cl.
*G03H 1/02* (2006.01)
*G03H 1/22* (2006.01)
(Continued)

(52) U.S. Cl.
CPC ............. *G03H 1/2286* (2013.01); *G02B 5/32* (2013.01); *G03H 1/0248* (2013.01); *G03H 1/28* (2013.01);
(Continued)

(58) Field of Classification Search
CPC ...... G02B 5/32; G02B 21/00; G02B 21/0056; G03H 1/0248; G03H 2001/0264;
(Continued)

(56) References Cited

U.S. PATENT DOCUMENTS 3,636,248 A    1/1972 Korpel
4,942,112 A    7/1990 Monroe et al.
(Continued)

OTHER PUBLICATIONS

Liu et al (Volume Holographic Hyperspectral Imaging, Applied Optics, vol. 43, No. 18, pp. 3581-3599, Jun. 20, 2004).*
(Continued)

*Primary Examiner* — Stephone B Allen
*Assistant Examiner* — Jyotsna Dabbi
(74) *Attorney, Agent, or Firm* — McCarter & English, LLP; David R. Burns

(57) ABSTRACT

A volume holographic imaging system, apparatus, and/or method enables the projection of a two-dimensional (2D) slice of a four-dimensional (4D) probing object. A 4D probing source object is illuminated to emit or scatter an optical field. A holographic element having one or more recorded holograms receives and diffracts the optical field into a diffracted plane beam having spectral information. A 4-f telecentric relay system includes a pupil filter on the relayed conjugate plane of the volume hologram and images the pupil of the volume hologram onto the front focal plane of the collector lens. A collector lens focuses the diffracted plane beam to a 2D slice of the 4D probing source object. The focused 2D slice is projected onto a 2D imaging plane. The holographic element may have multiple multiplexed holograms that are arranged to diffract light from the corresponding slice of the 4D probing source object.

24 Claims, 6 Drawing Sheets

Related U.S. Application Data on Nov. 25, 2009, provisional application No. 61/381,369, filed on Sep. 9, 2010.

(51) Int. Cl.

| | | |
|---|---|---|
| *G02B 5/32* | (2006.01) | |
| *G03H 1/28* | (2006.01) | |
| *G03H 1/00* | (2006.01) | |
| *G03H 1/26* | (2006.01) | |

(52) U.S. Cl.
CPC ............... *G03H 2001/0033* (2013.01); *G03H 2001/0072* (2013.01); *G03H 2001/2244* (2013.01); *G03H 2001/266* (2013.01)

(58) Field of Classification Search
CPC ....... G03H 2210/45; G03H 2001/0268; G03H 1/28; G03H 1/041; G03H 2223/55; G03H 2001/0428; G03H 2001/005; G03H 1/0406; G03H 1/22–1/2205; G03H 2001/2207; G03H 1/26; G03H 1/2645–1/265; G03H 2001/2665; G01B 9/021

See application file for complete search history.

(56) References Cited

U.S. PATENT DOCUMENTS

| | | | |
|---|---|---|---|
| 5,966,243 | A | 10/1999 | Braunecker et al. |
| 6,495,818 | B1 | 12/2002 | Mao |
| 6,524,756 | B1 | 2/2003 | Wu |
| 6,744,048 | B2 | 6/2004 | Hosokawa et al. |
| 6,934,060 | B2 | 8/2005 | Psaltis |
| 7,158,228 | B2 | 1/2007 | Psaltis et al. |
| 7,312,908 | B2 | 12/2007 | Takemori et al. |
| 9,256,202 | B2 * | 2/2016 | Barbastathis ........ G03H 1/0005 |
| 2007/0013999 | A1 | 1/2007 | Marks et al. |
| 2007/0216906 | A1 | 9/2007 | Javidi et al. |
| 2009/0009668 | A1 | 1/2009 | Tan et al. |
| 2009/0073563 | A1 | 3/2009 | Betzig |
| 2010/0039918 | A1 | 2/2010 | Tanaka |

OTHER PUBLICATIONS

International Preliminary Report on Patentability by International Bureau of WIPO for International Application PCT/US2010/051975 dated Apr. 11, 2012 (7 pages).

International Preliminary Report on Patentability by the International Bureau of WIPO for International Application PCT/US2010/051979 dated Apr. 11, 2012 (7 pages).

International Preliminary Report on Patentability by the International Bureau of WIPO for International Application PCT/US2010/051981 dated Apr. 11, 2012 (5 pages).

International Search Report and Written Opinion by International Searching Authority for International Application PCT/2010/51981 dated Dec. 13, 2010 (15 pages).

International Search Report and Written Opinion by International Searching Authority for International Application PCT/US2010/51975 mailed Dec. 13, 2010 (7 pages).

International Search Report and Written Opinion by International Searching Authority for International Application PCT/US2010/51979 dated Dec. 16, 2010 (13 pages).

Liu, Wenhai, George Barbastathis, and Demetri Psaltis. "Volume holographic hyperspectral imaging." Applied Optics, 43, No. 18, (Jun. 20, 2004): 3581-3599.

Luo, Y. "Novel Biomedical Imaging Systems", thesis submitted at University of Arizona. Jul. 18, 2008 (188 pages).

Luo, Yuan, et al. "Optimization of multiplexed holographic gratings in PQ-PMMA for spectral-spatial imaging filters." Optics letters 33, No. 6 (Mar. 15, 2008): 566-568.

Nagayama, Kuniaki. "Development of phase plates for electron microscopes and their biological application." European Biophysics Journal 37, No. 4 (Feb. 8, 2008): 345-358.

\* cited by examiner

SYSTEM, METHOD AND APPARATUS FOR WAVELENGTH-CODED MULTI-FOCAL MICROSCOPY

RELATED APPLICATIONS

This application claims priority to U.S. Provisional Application Ser. No. 61/250,306, entitled "Phase Contrast Multi-Focal Microscope" filed Oct. 9, 2009, U.S. Provisional Application Ser. No. 61/264,432, entitled "Wavelength-Coded Multi-Focal Microscope" filed Nov. 25, 2009, and U.S. Provisional Application Ser. No. 61/381,369, entitled "System, Method and Apparatus for Contrast Enhanced Multiplexing of Images" filed Sep. 9, 2010, each application in its entirety is incorporated herein by reference. This application is related to International Application No. PCT/US2010051975, entitled "System, Method and Apparatus for Phase Contrast Enhanced Multiplexing of Images" filed Oct. 8, 2010, and International Application No. PCT/US2010.051979, entitled "System, Method and Apparatus for Contrast Enhanced Multiplexing of Images" filed Oct. 8, 2010, each application in its entirety is incorporated herein by reference.

STATEMENT OF GOVERNMENT INTEREST

The United States government has rights in this application as a result of financial support provided by governmental agencies in the development of aspects of the disclosure. Parts of this work were supported by a grant from the National Institutes of Health, Grant No.: R21CA118167 and the National Science Council Contract No.: NSC-97-2917-I-564-115.

BACKGROUND

This disclosure relates generally to imaging systems, methods and apparatus, and more particularly to volume holographic imaging systems, methods and apparatus that obtain enhanced images from multiple depths within an object.

Microscopic imaging systems are beneficial for biomedical and clinical applications. Three dimensional microscopic imaging systems, such as confocal microscopy and optical coherence tomography (OCT) have been developed to detect tissue structures within biological samples. Both confocal microscopy and OCT require mechanical, opto-electronic, or acousto-optic scanning in two lateral and axial dimensions.

Volume holographic multiplexing (VHM) has been developed to eliminate the need for mechanical, opto-electronic, or acousto-optic scanning. In VHM, holographic gratings are superimposed in a volume recording material such that each grating obtains depth resolved information from different depths within the object. Microscopic imaging systems incorporating VHM visualize features of the object at different focal planes, for example, tissue structures at different focal planes. Each focal plane within the object can be projected to a different lateral location on a camera. Thus, the entire object volume is imaged slice-wise onto the camera without the need for scanning. VHM imaging systems have many useful applications such as spectral and three dimensional biological imaging (hereafter four-dimensional (4D) imaging), endoscope imaging systems, spectrometers, and the like.

Conventionally, VHM utilizes a spectrally broadband source to illuminate objects of interest. If objects of interest are illuminated by a spectrally broadband source, the contrast in VHM systems is reduced because colors originating at multiple depths cannot be separated due to the degeneracy properties of the hologram.

SUMMARY

Embodiments taught herein relate generally to imaging systems, methods and apparatus, and more particularly to imaging systems, methods and apparatus that obtain biological tissue structures simultaneously at different focal planes using broadband illumination by light emitting diodes.

Exemplary wavelength-coded multi-focal imaging systems taught herein simultaneously display multiple depth sections of an object of interest using wavelength-coded holographic gratings. Wavelength-coded holographic gratings multiplexed with a volume hologram are recorded using a single illumination wavelength, eliminating the need for multiple or tunable lasers. The exemplary systems can be extended to provide an increased number of wavelength-coded focal planes with more multiplexed holographic gratings within a volume hologram. The exemplary systems and apparatuses can monitor spectrum properties of an object such as spectrum shift or fluorescence intermittency due to a chemical reaction or interaction.

An exemplary apparatus as taught herein includes focusing lenses, a holographic element and an imaging plane. The lenses and holographic element project an image onto the imaging plane. The holographic element is a volume hologram with at least two multiplexed and wavelength-coded holographic gratings. In exemplary embodiments the hologram is recorded in phenanthrenquinone doped poly methyl methacrylate (PQ-doped PMMA).

As taught herein, exemplary volume imaging system for imaging a source object as taught herein includes a holographic element and collector optics is disclosed. The holographic element is capable of recording one or more holograms of the source object and is configured to receive and diffract an optical field emitted from the source object onto one or more diffracted plane beams. The collector optics are configured to focus one or more diffracted plane beams from the source object into a two dimensional slice of the source object and projects the focused two dimensional slice along an optical path onto a surface. The holographic element is a volume hologram with at least two wavelength-coded holographic gratings. The collector optics may include an imaging lens adjacent the holographic element. The holograms of the source object are multiplexed holograms and diffract an optical field from different slices of the source object onto non-overlapping sections of the surface. The source object is defined in three dimensional space and real time.

As taught herein, an exemplary method for imaging an object in three-dimensions and in real time in which an emitted optical field of an object is received by a holographic element which diffracts the received optical field into one or more diffracted plane beams is disclosed. The diffracted plane beams are focused into a two-dimensional slice of the object and projected onto an imaging plane or an imaging surface. The focusing is performed using a volume hologram with at least two wavelength-coded holographic gratings. The diffraction is based on one or more Bragg degeneracy properties.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which:

FIG. 7 illustrates an image of one of the two depth-resolved images obtained in FIG. 6 with only the blue LED turned on.

FIG. 8 illustrates an image of one of the two depth-resolved images obtained in FIG. 6 with only the red LED turned on.

DESCRIPTION OF EXEMPLARY EMBODIMENTS

In accordance with various embodiments, taught herein are methods for and wavelength-coded multi-focal imaging devices and systems, for example, a wavelength-coded multi-focal microscope, that can simultaneously display multiple depths within an object through the use of wavelength-coded holographic gratings multiplexed within a transmissive volume hologram. The recording of wavelength-coded holographic gratings in a volume hologram can be performed at a single illumination wavelength eliminating the need for multiple or tunable lasers. Advantageously an exemplary wavelength coded multi-focal microscope as taught herein can obtain biological tissue structures simultaneously at different focal planes using broadband illumination. Likewise, an exemplary wavelength coded multi-focal microscope as taught herein can simultaneously project non-overlapping images obtained of the biological/tissue structure. In addition, a wavelength-coded multi-focal microscope as taught herein can be used to monitor spectrum properties of a biological tissue structure, for example, monitoring spectrum shift and fluorescence intermittency due to chemical reactions or interactions. In an exemplary system, two focal planes are coded for spectral emissions from a red light source and for spectral emissions from a blue light source, and, in turn, their corresponding reconstructed images are simultaneously displayed on an imaging plane side-by-side without overlap. We designate the red wavelength as the deeper focal plane to take advantage of its longer penetration depth.

Figure 1:
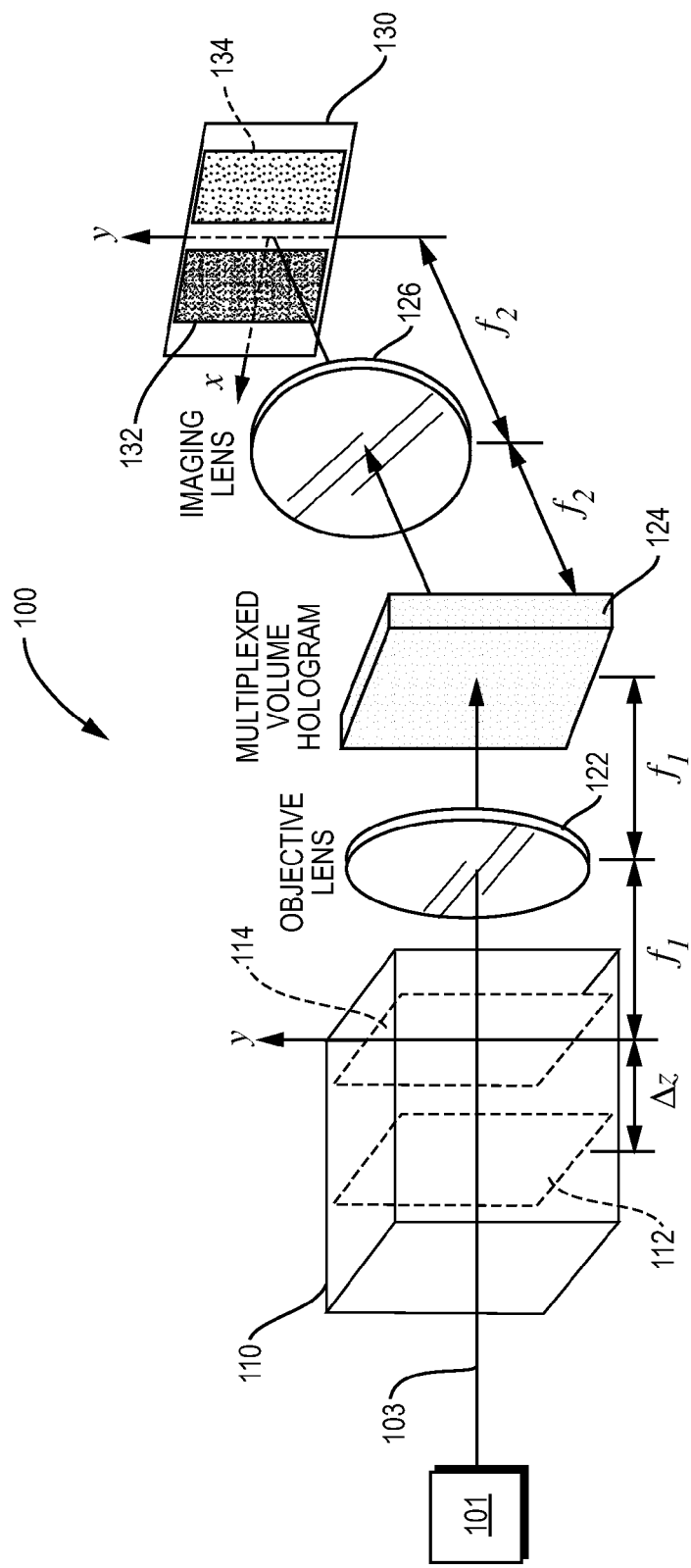
FIG. 1 depicts an illustrative diagrammatic view of an exemplary wavelength-coded multi-focal imaging system as taught herein.

FIG. 1 illustrates an exemplary wavelength-coded multi-focal imaging system 100 as taught herein. The system is a 4-f telecentric relay system which includes a source of electromagnetic radiation 101, an objective lens 122, a multiplexed volume hologram 124, an imaging lens 126 and an imaging plane 130. Source 101 emits an electromagnetic field along signal arm 103 to illuminate imaging object 110. Objective lens 122 acts to collimate the optical field emitted and/or scattered from the imaging object 110. The collimated field passes through adjacent multiplexed volume hologram 124 to imaging lens 126 which focuses the emitted holographic representation from the multiplexed volume hologram 124 onto the imaging plane 130.

In exemplary embodiments, multiplexed volume hologram 124 has two multiplexed and wavelength-coded holographic gratings. Each of the exemplary two multiplexed gratings within the multiplexed volume hologram 124 is Bragg matched to a first focal plane 112 and second focal plane 114 of the imaging object 110. The wavelength-coded holographic gratings are diffractive elements consisting of a periodic phase or absorption perturbation throughout the entire volume of the element. When a beam of incident light satisfies the Bragg phase matching condition it is diffracted by the periodic perturbation. Those skilled in the art would appreciate that Bragg matched refers to satisfying the Bragg matching condition which occurs when the diffraction efficiency of a transmissive volume hologram is maximized.

First focal plane 112 and second focal plane 114 are separated by $\Delta z$ and are coded for a specific wavelength of light. Thus the corresponding field of view associated with each focal plane is observable under illumination by its own designated wavelength. The multiplexed volume hologram 124 is located at the Fourier plane or focal plane of the 4-f system located between a plane being probed in the imaging object 110 and the imaging plane 130. The 4-f system is depicted between the focal plane 114 and the imaging plane 130 by the distances $f_1$ and $f_2$. The distance $f_1$ is the distance between the focal plane 114 and the objective lens 122. Those skilled in the art would appreciate that the distance $f_1$ is also the distance between the objective lens 122 and the multiplexed grating within volume hologram 124. The distance $f_2$ is the distance between the multiplexed volume hologram 124 and the imaging lens 126. Those skilled in the art would appreciate that the distance $f_2$ is also the distance between the imaging lens 122 and the imaging plane 130. After the collimated optical field passes through the multiplexed volume hologram 124, holographic representations of the first and second focal planes 112 and 114 passes through the imaging lens 126 which projects a first image 132 and a second image 134 side by side onto the imaging plane 130. The first and second images 132 and 134 are two two-dimensional (2D) slices of the imaging object 110 taken along the x-axis at the first focal plane 112 and the second focal plane 114, respectively.

In exemplary embodiments, the source of electromagnetic radiation 101 may include a plurality of coherent light sources or may be a broadband light source such as a dispersed white-light source with chromatic foci or the like. The imaging plane 130 may be part of a charge couple device or camera which may be connected to or part of a computer, projector, or other such electronic device. In contrast to confocal microscopy which uses diffractive optical elements, as taught herein an arbitrary arrangement of wavelengths as well as longitudinal foci can be coded and reconstructed using appropriately multiplexed holograms. This is because volume holographic wavelength coding as taught herein does not rely on dispersion or chromatic aberration. In various embodiments, the two focal planes 112 and 114 are coded with red and blue wavelength light, respectively, and their corresponding reconstructed images, 132 and 134, respectively, are advantageously displayed side-by-side without overlap on the imaging plane 130.

Figure 2:
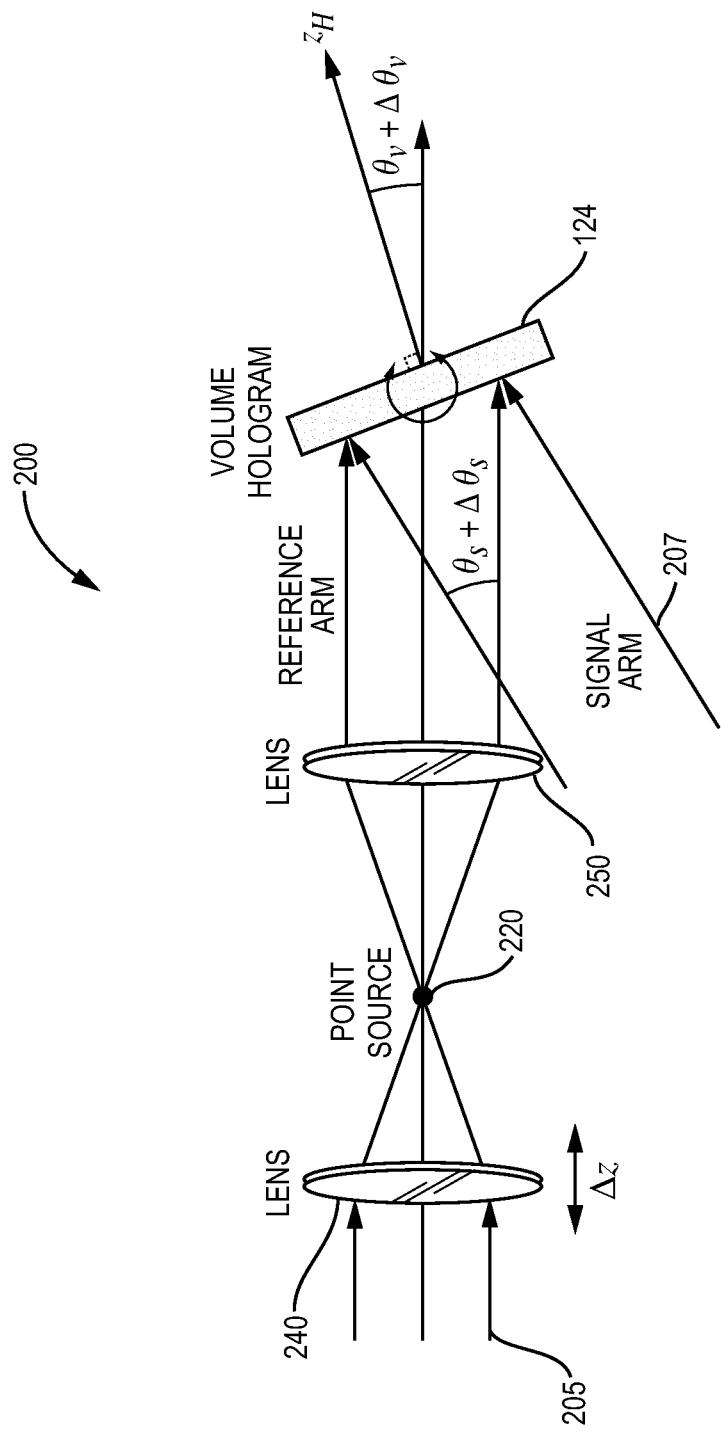
FIG. 2 depicts an illustrative diagrammatic view of an exemplary recording arrangement for a wavelength-coded holographic grating within a multiplexed volume hologram.

FIG. 2 illustrates an exemplary recording arrangement 200 for a multiplexed and wavelength-coded holographic gratings in the multiplexed volume hologram 124. The recording of the multiplexed and wavelength-coded holographic gratings takes place at a single wavelength by utilizing the Bragg degeneracy property. Those skilled in the art will appreciate that the Bragg degeneracy refers to the cross-talk that occurs because the Bragg matching condition can be satisfied by more than one angle of incidence of a recording beam on a volume hologram.

A collimated electromagnetic radiation beam from an electromagnetic radiation source is split into a reference arm 205 and a signal arm 207. A point source 220 in the reference arm 205 is formed from the lens 240. Light emerging from the recording medium of the multiplexed volume hologram 124 matches the interference pattern formed by point source 220 and signal arm 207 at a plane inside the volume hologram 124. The position of the point source 220 is controlled by moving the lens 240 by $\Delta z$ between exposures while the lens 250 remains stationary. The angle of the signal beam $\theta_s$ and angle of the hologram $\theta_v$ are changed by $\Delta\theta_s$ and $\Delta\theta_v$, respectively, between exposures to maintain the same incident beam angle. By varying the angle of the signal beam $\theta_s$ and angle of the hologram $\theta_v$, a single incident beam can be used to record a grating, in the recording medium of the multiplexed volume hologram 124, which provides for reconstruction using a beam with different wavelength from the recording beam.

In exemplary embodiments, the recording medium of the multiplexed volume hologram 124 is phenanthrenquinone doped poly methyl methacrylate (PQ-doped PMMA). In other embodiments, other materials may be used as a recording medium. By way of example, Aprilis ULSH-500, $LiNbO_3$ including Zn-doped $LiNbO_3$ and DuPont photopolymers may be used as recording material. (See Atsushi Sato et al, Applied Optics vol. 42, pp. 778-784, (2003), Yasuo Tomita et al, Optics Express vol. 14, pp. 5773-5778 (2006), and Raymond K. Kostuk et al, Applied Optics vol. 38, pp. 1357-1363 (1999)). In some embodiments, the multiplexed volume hologram 124 is approximately 1.5 mm thick and two gratings are recorded using an Argon ion (Ar+) laser operating at a wavelength of 488 nm. Those skilled in the art will appreciate that a laser or other source of electromagnetic radiation with appropriate wavelength in the corresponding range of sensitivity of the recording medium may be used for recording. In some embodiments, the numerical apertures of the lens 240 and the lens 250 are 0.65 and 0.55, respectively.

Two relay systems, not shown, are used in the signal arm 205 and the reference arm 207 to maintain constant irradiance at the plane of the recording medium of the multiplexed volume hologram 124 when recording is taking place. In some embodiments, the nominal angles in air are $\theta_s=47.5°$, $\Delta\theta_s=17.5°$, $\theta_v=23.75°$, $\Delta\theta_v=7.75°$, and the axial displacement of the lens 420 is approximately $\Delta z=50$ μm.

Figure 3:
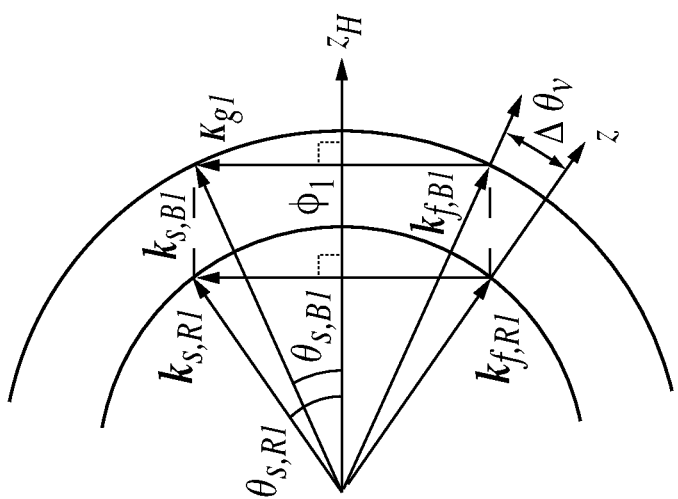
FIG. 3 depicts an illustrative k-sphere diagram of a first grating recorded in the exemplary multiplexed volume hologram of FIG. 2.

FIG. 3 is an exemplary k-sphere diagram, illustrating the first grating recorded in an exemplary multiplexed volume hologram as taught herein using an Ar+ laser with wavelength $\lambda_B=488$ nm and probed in degenerate fashion by a red-color laser with wavelength $\lambda_R=633$ nm. Those of skill in the art will appreciate that the k-sphere diagram depicts the energy of a beam in vector form including the components of the vector in k-space, the spatial frequency domain where $$k = \frac{2\pi}{\lambda}.$$

Vector $k_{s,B1}$ is the wave vector of the recording signal beam and vector $k_{f,B1}$ is the wave vector of the reference beam. Vector $K_{g1}$ is the resulting grating vector from wave vectors $k_{s,B1}$ and $k_{f,B1}$, and angle $\phi_1$ is the angle of the grating vector with respect to the hologram normal $z_H$. In various embodiments, $K_{g1}$ is perpendicular to the hologram normal, and thus $\phi_1=\pi/2$. The signal beam angle for recording wave vector in $\lambda_B=488$ nm is $\theta_{s,B1}=23.75°$ from the hologram normal, and the corresponding signal beam angle for probing at $\lambda_R=633$ nm is $\theta_{s,R1}=31.5°$.

Figure 4:
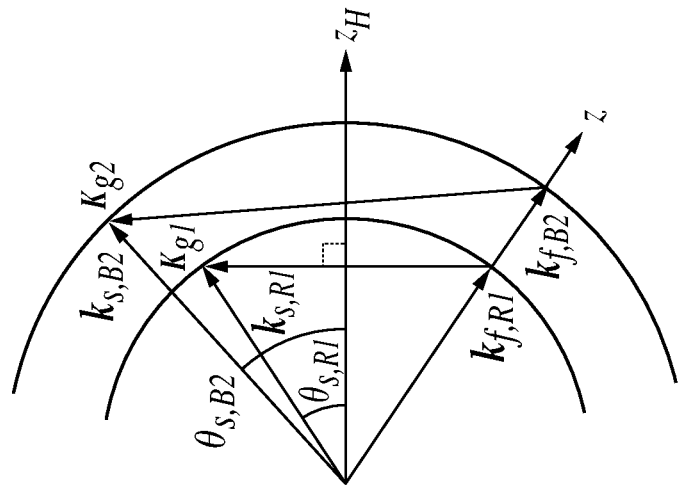
FIG. 4 depicts an illustrative k-sphere diagram of a second grating recorded in the exemplary multiplexed volume hologram of FIG. 2.

FIG. 4 illustrates the exemplary resultant k-sphere diagram of two wavelength-coded gratings, consisting of the first grating vector $K_{g1}$ probed at $\lambda_R=633$ nm and the second grating vector $K_{g2}$ probed at $\lambda_B=488$ nm. The reference beams $k_{fR1}$ and $k_{fB2}$ share a common axis. The two Bragg-matched diffracted beams $k_{sR1}$ and $k_{sB2}$ are separated by two degrees. The diffracted beam angle of the second grating is $\theta_{s,B2}=33.5°$ from the hologram normal $z_H$. The probe beams $k_{f,R1}$, $k_{f,B2}$ of the two gratings are co-propagating and have a hologram rotation angle $\Delta\theta_v$. The relationship between the hologram rotation angle $\Delta\theta_v$ and the inter beam angle is given as:

$$\theta_{s,B1} = \phi_1 - \cos^{-1}\left[\frac{\lambda_B}{\lambda_R}\cos(\phi_1 - \theta_{s,R1})\right], \text{ and } \Delta\theta_v = \theta_{s,R1} - \theta_{s,B1}.$$

An exemplary wavelength-coded multi-focal microscope was built using an Olympus objective lens (ULWDMSPlan50X), a Mitutuyo imaging lens (MPlanAPO20X), and a QImaging CCD array (QIC-F-CLR-12C). The two multiplexed gratings had diffraction efficiencies of approximately 30% and 40% at $\lambda_B=488$ nm.

Figure 5:
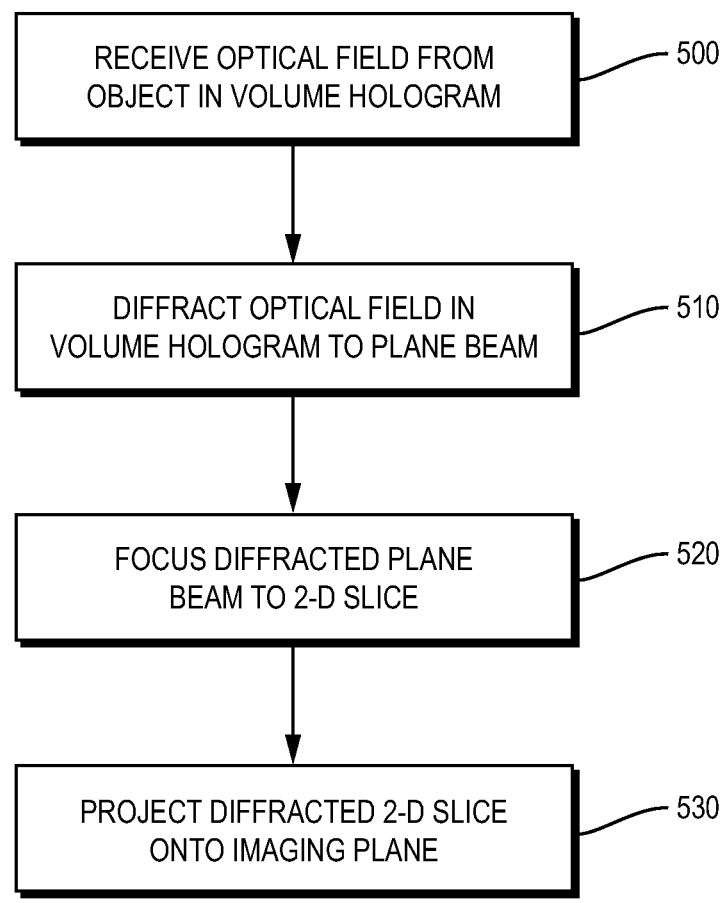
FIG. 5 is an illustrative flow diagram depicting an illustrative method for practicing an embodiment of the wavelength-coded multi-focal imaging system as taught herein.

FIG. 5 depicts an exemplary block flow diagram of a method of imaging an object defined in three-dimensional space and real time using an exemplary wavelength-coded multi-focal imaging system as taught herein. In step 500, multiplexed volume hologram 124 receives an optical field that has been emitted and/or scattered from an object 110. In some embodiments, the scattered optical field may be processed by one or more optical elements, such as lens 122, to focus the scattered optical field onto the volume hologram 124. In step 510, a wavelength coded grating with the multiplexed volume hologram 124 diffracts the portion of the received optical field with matching wavelength into a plane beam. The plane beam is a holographic representation of a 2-D slice of the object 110 taken at a plane within the object 110 that is Bragg matched to the grating in the volume hologram 124. In step 520, the diffracted plane beam is focused by a lens 126 into a 2-D image that is projected in step 530 onto an imaging plane 130. In some embodiments, the volume hologram 124 has two or more wavelength coded gratings recorded therein. In the same embodiment, the number of 2-D images that are projected on to the imaging plane 130 corresponds to the number of gratings. Advantageously, the multiple images are projected to non-overlapping portions of the imaging plane.

Figure 6:
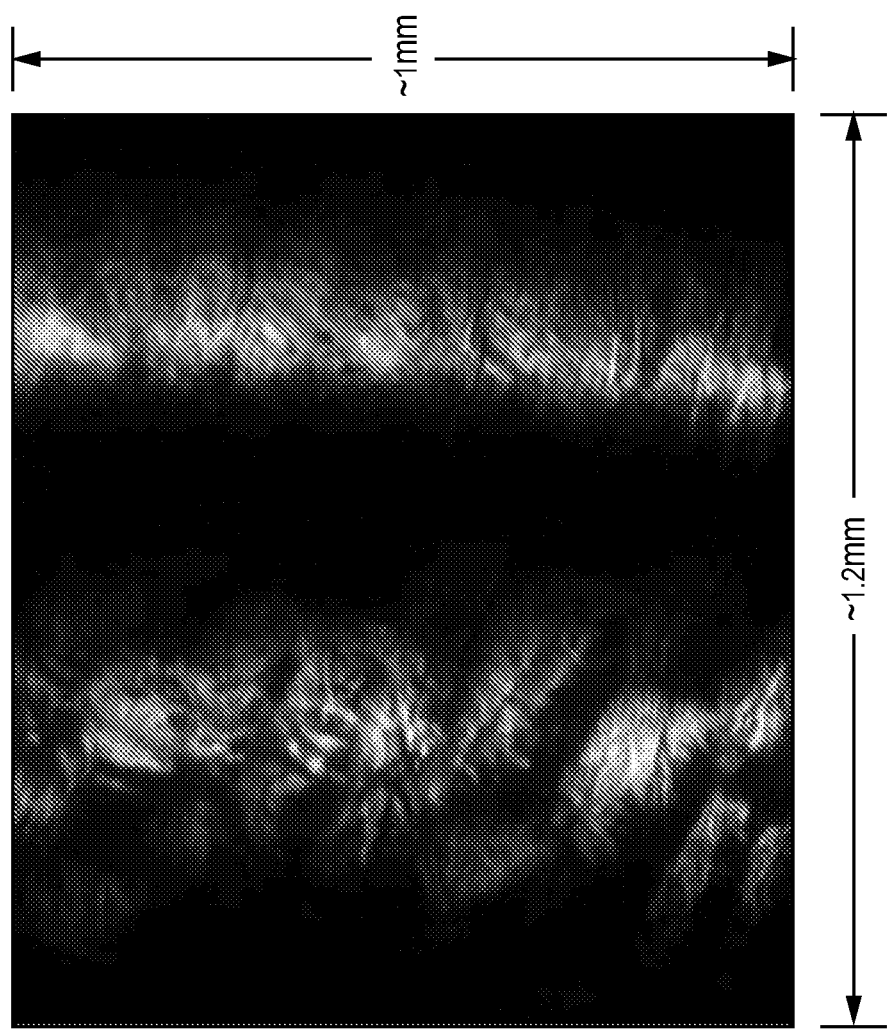
FIG. 6 illustrates two depth-resolved images of an onion obtained by the exemplary wavelength-coded multi-focal imaging system of FIG. 1 using both blue and red LEDs.

FIG. 6 depicts two exemplary depth-resolved images of an onion skin obtained simultaneously from a single frame on an exemplary wavelength-coded multi-focal imaging system as taught herein. The frame is approximately 1 millimeter by 1.2 millimeters in dimension. The onion skin was illuminated simultaneously with blue and red LEDs using an exemplary wavelength-coded multi-focal imaging system as depicted in FIG. 1. One reconstructed layer is close to the onion surface, and the other is at a depth of 50

μm below the surface. The central wavelength of the blue LED is approximately $\lambda_B=488$ nm with a spectral bandwidth of 45 nm, and the central wavelength of the red LED is approximately $\lambda_R=633$ nm with a spectral bandwidth of 25 nm.

Figure 8:
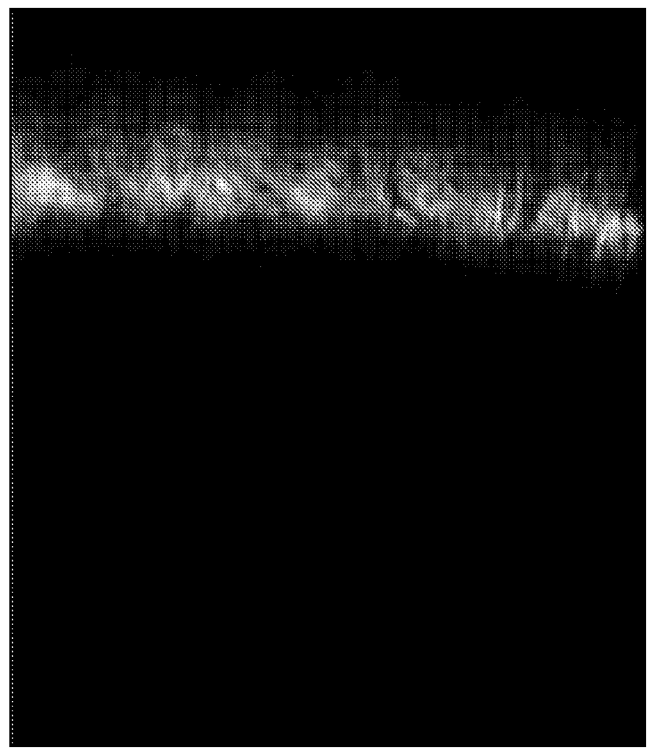
Figure 7:
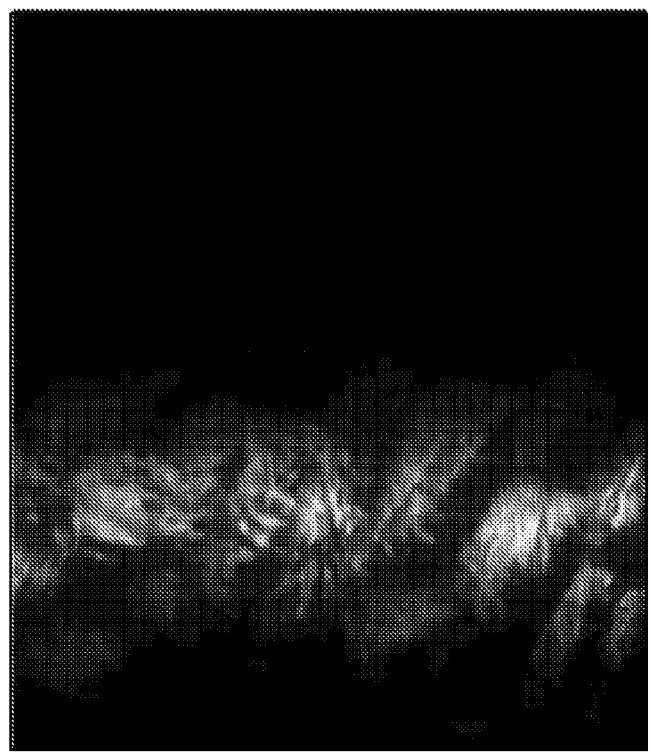

FIG. 7 is the image of onion skin of FIG. 6 with the blue LED on and red LED off. FIG. 8 is the image of onion skin of FIG. 6 with the red LED on and blue LED off. The reconstructed image illuminated using the blue LED has a wider lateral field of view than that with the red LED for reconstruction because the width of each image increases with the spectral width of the illumination source.

Advantageously, the wavelength-coded holographic gratings taught in the exemplary imaging system can simultaneously obtain multiple-depth information from an object of interest at the same location, for example, an object of interest may include a biological sample. The brightness and contrast between focal planes can be controlled by adjusting the intensity of different sources of electromagnetic radiation. Since the image at a different focal plane can be probed by a designated wavelength, the system can be readily adapted to other illumination configurations, including a focused pulse laser with broad spectral bandwidth or dispersed light source with chromatic foci spread in longitudinal direction.

Although the teachings herein have been described with reference to exemplary embodiments and implementations thereof, the disclosed methods, systems and apparatuses are not limited to such exemplary embodiments/implementations. Rather, as will be readily apparent to persons skilled in the art from the description taught herein, the disclosed methods, systems and apparatuses are susceptible to modifications, alterations and enhancements without departing from the spirit or scope hereof Accordingly, all such modifications, alterations and enhancements are within the scope hereof are encompassed herein.

What is claimed:

1. A microscope comprising:
an objective lens for receiving and collimating optical electromagnetic radiation from an illuminated source object of interest;
a multiplexed volume hologram with a first wavelength-coded holographic grating and a second wavelength-coded holographic grating to receive and diffract collimated optical electromagnetic radiation from the objective lens, the first wavelength-coded holographic grating configured to diffract light at a first wavelength emitted or scattered from a selected first depth of the source object into a beam diffracted at a first angle with respect to the multiplexed volume hologram, the second wavelength-coded holographic grating configured to diffract light at a second wavelength emitted or scattered from a selected second depth of the source object into a beam diffracted at a second angle with respect to the multiplexed volume hologram with the first wavelength being different from the second wavelength and the first angle being different from the second angle,
wherein the selected first depth of the source object corresponds to a first focal plane determined by a first location of a point source generated from a single light source during recordation of the first holographic grating;
wherein the selected second depth of the source object corresponds to a second focal plane determined by a second location of the point source generated from the single light source during recordation of the second holographic grating;
wherein the first holographic grating corresponding to the first focal plane is coded for reconstruction by the first wavelength of light and the second holographic grating corresponding to the second focal plane is coded for reconstruction by the second wavelength of light;
wherein an angle of a signal beam with respect to a reference beam was different during recordation of the second holographic grating than during recordation of the first holographic grating and an angle of the volume hologram with respect to the reference beam was different during recordation of the second holographic grating than during recordation of the first holographic grating; and
a focusing element configured to focus the diffracted beams from the first and the second grating onto an imaging plane forming corresponding images of two-dimensional slices of the object taken at the first object depth corresponding to the first focal plane and the second object depth corresponding to the second focal plane with the images occupying different positions on the imaging plane.

2. The microscope of claim 1, wherein the volume hologram is transmissive.

3. The microscope of claim 1, wherein the microscope is configured to project an image diffracted from each wavelength-coded holographic grating onto the imaging plane simultaneously.

4. The microscope of claim 1, wherein the volume hologram is recorded in phenanthrenquinone doped poly methyl methacrylate.

5. The microscope of claim 1, further comprising a source of optical electromagnetic radiation for illumination of the source object.

6. The microscope of claim 1, wherein diffraction by the volume hologram is based on one or more Bragg matching properties.

7. The microscope of claim 1, wherein the first holographic grating corresponding to the first focal plane is specifically coded for reconstruction by the first wavelength of light and the second holographic grating corresponding to the second focal plane is specifically coded for reconstruction by the second wavelength of light.

8. A multiplexed volume hologram comprising a first wavelength-coded holographic grating and a second wavelength-coded holographic grating, the first wavelength-coded holographic grating configured to diffract light at a first wavelength emitted or scattered from a selected first depth of a source object into a beam diffracted at a first angle with respect to the multiplexed volume hologram, the second wavelength-coded holographic grating configured to diffract light at a second wavelength emitted or scattered from a selected second depth of the source object into a beam diffracted at a second angle with respect to the multiplexed volume hologram with the first wavelength being different from the second wavelength and the first angle being different from the second angle,
wherein the selected first depth of the source object corresponds to a first focal plane determined by a first location of a point source generated from a single light source during recordation of the first holographic grating,
wherein the selected second depth of the source object corresponds to a second focal plane determined by a second location of the point source generated from the single light source during recordation of the second holographic grating, wherein the first holographic grating corresponding to the first focal plane is coded for reconstruction by the first wavelength of light and the second holographic grating corresponding to the second focal plane is coded for reconstruction by the second wavelength of light, and wherein an angle of a signal beam with respect to a reference beam was different during recordation of the second holographic grating than during recordation of the first holographic grating and an angle of the volume hologram with respect to the reference beam was different during recordation of the second holographic grating than during recordation of the first holographic grating.

9. The volume hologram of claim 8, wherein the hologram is recorded in phenanthrenquinone doped poly methyl methacrylate.

10. A volume imaging system for imaging an object of interest, the system comprising:
a multiplexed volume holographic element with a first wavelength-coded holographic grating and a second wavelength-coded holographic grating, the first wavelength-coded holographic grating configured to diffract light at a first wavelength emitted or scattered from a selected first depth of the object of interest into a beam diffracted at a first angle with respect to the multiplexed volume holographic element, the second wavelength-coded holographic grating configured to diffract light at a second wavelength emitted or scattered from a selected second depth of the object of interest into a beam diffracted at a second angle with respect to the multiplexed volume holographic element with the first wavelength being different from the second wavelength and the first angle being different from the second angle,
wherein the selected first depth of the object of interest corresponds to a first focal plane determined by a first location of a point source generated from a single light source during recordation of the first holographic grating,
wherein the selected second depth of the object of interest corresponds to a second focal plane determined by a second location of the point source generated from the single light source during recordation of the second holographic grating,
wherein the first holographic grating corresponding to the first focal plane is coded for reconstruction by the first wavelength of light and the second holographic grating corresponding to the second focal plane is coded for reconstruction by the second wavelength of light, and
wherein an angle of a signal beam with respect to a reference beam was different during recordation of the second holographic grating than during recordation of the first holographic grating, and an angle of the volume holographic element with respect to the reference beam was different during recordation of the second holographic grating than during recordation of the first holographic grating;
collector optics configured to:
focus the diffracted beams from the first and the second grating to form corresponding images of two dimensional slices of the object of interest taken at the first object depth corresponding to the first focal plane and the second object depth corresponding to the second focal plane, and
project the focused images along an optical path onto a surface with the images occupying different positions on the imaging plane.

11. The volume imaging system of claim 10, wherein the volume holographic element is transmissive.

12. The volume imaging system of claim 10, wherein the collector optics project an image diffracted from each wavelength-coded holographic grating onto the surface simultaneously.

13. The volume imaging system of claim 10, wherein the holographic element diffracts the optical field scattered from the object of interest based on one or more Bragg matching properties.

14. The volume imaging system of claim 10, wherein the collector optics include an imaging lens.

15. The volume imaging system of claim 10, wherein the volume imaging system is configured to diffract optical fields from different slices of the object of interest to non-overlapping sections of the surface.

16. The volume imaging system of claim 10, wherein the object of interest is defined in three dimensional space.

17. A method for imaging an object in four-dimensions comprising:
receiving in a multiplexed holographic element optical fields from an object of interest, the multiplexed holographic element containing a first wavelength-coded holographic grating and a second wavelength-coded holographic grating, the first wavelength-coded holographic grating configured to diffract light at a first wavelength emitted or scattered from a selected first depth of the object into a beam diffracted at a first angle with respect to the multiplexed holographic element, the second wavelength-coded holographic grating configured to diffract light at a second wavelength emitted or scattered from a selected second depth of the object into a beam diffracted at a second angle with respect to the multiplexed holographic element with the first wavelength being different from the second wavelength and the first angle being different from the second angle,
wherein the selected first depth of the object of interest corresponds to a first focal plane determined by a first location of a point source generated from a single light source during recordation of the first holographic grating;
wherein the selected second depth of the object of interest corresponds to a second focal plane determined by a second location of the point source generated from the single light source during recordation of the second holographic grating;
wherein the first holographic grating corresponding to the first focal plane is coded for reconstruction by the first wavelength of light and the second holographic grating corresponding to the second focal plane is coded for reconstruction by the second wavelength of light;
wherein an angle of a signal beam with respect to a reference beam was different during recordation of the second holographic grating than during recordation of the first holographic grating, and an angle of the holographic element with respect to the reference beam was different during recordation of the second holographic grating than during recordation of the first holographic grating;
diffracting the received optical fields in the holographic element to one or more diffracted plane beams;
focusing the diffracted plane beams from each grating to corresponding images of two-dimensional slices of the object taken at the first object depth corresponding to the first focal plane and the second object depth corresponding to the second focal plane; and projecting the focused two-dimensional images onto an imaging plane with the two-dimensional images occupying different positions on the imaging plane.

18. The method of claim 17, wherein the focusing is performed by the holographic element.

19. The method of claim 17, further comprising processing the optical fields through a plurality of optical elements.

20. The method of claim 17, wherein the images are simultaneously displayed on the imaging plane.

21. The method of claim 20, wherein one of the optical elements comprises a collimating lens configured to collimate the optical field.

22. The method of claim 21, wherein one of the optical elements comprises a focusing lens.

23. The method of claim 22, wherein one of the optical elements forms part of the holographic element.

24. The method of claim 17 wherein diffraction by the holographic element is based on one or more Bragg matching properties.

* * * * *